United States Patent
Cho et al.

(10) Patent No.: US 8,345,564 B2
(45) Date of Patent: Jan. 1, 2013

(54) UNIVERSAL PLUG AND PLAY METHOD AND APPARATUS TO PROVIDE REMOTE ACCESS SERVICE

(75) Inventors: Seong-ho Cho, Seoul (KR); Se-hee Han, Seoul (KR); Sang-hyeon Kim, Seoul (KR); Mahfuzur Rahman, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 957 days.

(21) Appl. No.: 12/318,962

(22) Filed: Jan. 13, 2009

(65) Prior Publication Data

US 2009/0180468 A1     Jul. 16, 2009

Related U.S. Application Data

(60) Provisional application No. 61/021,191, filed on Jan. 15, 2008.

(30) Foreign Application Priority Data

Aug. 12, 2008 (KR) .................. 10-2008-0079037

(51) Int. Cl.
*G08C 15/00* (2006.01)
*G06F 17/22* (2006.01)
(52) U.S. Cl. .................. 370/252; 715/239
(58) Field of Classification Search .......... None
See application file for complete search history.

(56) References Cited

U.S. PATENT DOCUMENTS

| 2005/0010638 A1* | 1/2005 | Richardson et al. .......... 709/204 |
| 2006/0245403 A1 | 11/2006 | Kumar |
| 2007/0043829 A1 | 2/2007 | Dua |
| 2007/0076729 A1 | 4/2007 | Takeda |
| 2007/0203979 A1 | 8/2007 | Walker et al. |
| 2007/0276925 A1 | 11/2007 | La Joie et al. |
| 2008/0002709 A1 | 1/2008 | Kennedy et al. |
| 2010/0191829 A1* | 7/2010 | Cagenius ...................... 709/219 |

FOREIGN PATENT DOCUMENTS

| KR | 10-2007-0018196 | 2/2007 |
| KR | 10-2009-0078716 | 7/2009 |

OTHER PUBLICATIONS

Rosenberg et al. IETF RFC 3261, Jun. 2002, pp. 1 and 11.*
J. Rosenberg et al., "Traversal Using Relay NAT (TURN)", MIDCOM, Internet Draft of the Internet Society, Sep. 2005, pp. 1-40.

(Continued)

*Primary Examiner* — Jianye Wu
(74) *Attorney, Agent, or Firm* — Staas & Halsey LLP

(57) ABSTRACT

Disclosed are a universal plug and play (UPnP) method and a UPnP apparatus providing remote access service. The method includes receiving external inputs of an identifier of a remote access server (RAS) to generate a credential and a session initiation protocol (SIP) identifier of the RAS, generating a payload of a SIP packet including a credential identifier (ID) generated based on the identifier of the RAS, remote access transport agent (RATA) capability information, and a transport address (TA) set corresponding to candidate IP addresses to access a remote access client (RAC), and transmitting the SIP packet to the RAS.

22 Claims, 6 Drawing Sheets

OTHER PUBLICATIONS

Petros Belimpasakis et al., "Remote Access to Universal Plug and Play (UPnP) Devices Utilizing the Atom Publishing Protocol", Third International Conference on Networking and Services, 2007, pp. 1-6.

Jung-Tae Kim et al., "Implementation of the DLNA Proxy System for Sharing Home Media Contents", IEEE, 2007, pp. 139-144.

J. Rosenberg, "Interactive Connectivity Establishment (ICE): A Protocol for Network Address Translator (NAT) Traversal for Offer/Answer Protocols", The IETF Trust Internet Draft, 2007, pp. 1-120.

J. Rosenberg, "Session Traversal Utilities for (NAT) (STUN)", The IETF Trust BEHAVE Working Group Internet Draft, 2008, pp. 1-49.

J. Rosenberg, "Transversal Using Relays around NAT (TURN): Relay Extensions to Session Traversal Utilities for NAT (STUN)", The IETF Trust BEHAVE Internet Draft, 2008, pp. 1-40.

Andreas Müller et al., "On the Applicability of Knowledge Based NAT-Traversal for Home Networks", Networking, 2008, pp. 264-275.

Extended European Search Report dated Dec. 23, 2011 issued in corresponding European Patent Application No. 09702451.7.

U.S. Appl. No. 12/585,082, filed Sep. 2, 2009, Seong-ho Cho, et al., Samsung Electronics Co., Ltd.

International Search Report for corresponding International Application PCT/KR2009/000225; dated Aug. 17, 2009.

US Office Action mailed May 25, 2012 in related U.S. Appl. No. 12/585,082.

U.S. Notice of Allowance mailed Oct. 23, 2012 in related U.S. Appl. No. 12/585,082.

\* cited by examiner

UNIVERSAL PLUG AND PLAY METHOD AND APPARATUS TO PROVIDE REMOTE ACCESS SERVICE

CROSS-REFERENCE TO RELATED APPLICATIONS

This application claims the benefit of U.S. Provisional Patent Application No. 61/021,191, filed on Jan. 15, 2008 and Korean Patent Application No. 10-2008-0079037, filed on Aug. 12, 2008, in the Korean Intellectual Property Office, the disclosure of which is incorporated herein in its entirety by reference.

BACKGROUND

1. Field

The present invention relates to a universal plug and play (UPnP) middleware-based home network, and more particularly, to a UPnP method and a UPnP apparatus to easily set channel setting information (RATA profile) and pass network address translation (NAT) to provide remote access service.

2. Description of the Related Art

Due to the spread of home networking, conventional home networking environments centering on personal computers (PC) are gradually shifting to home networking environments including electronic equipment using various lower networking technologies. As a result, home network middleware technologies such as universal plug and play (UPnP) are being developed to group such electronic equipment in a unified network by using Internet protocols (IP).

UPnP technology enables home appliances in a home network to be peer-to-peer networked on the basis of a distributed and open networking structure instead of being under centralized control.

Generally, in a home network middleware, a UPnP device models its service with actions and state variables. A UPnP control point automatically discovers the UPnP device to use the service.

The UPnP device architecture 1.0 uses the distributed and open networking to discover a UPnP device via an IP multicast in a home network. However, it cannot currently be guaranteed that IP multicast service is provided at the Internet level, and thus controlling a UPnP device using information obtained from the discovery of the UPnP device cannot be performed via the Internet.

As a result, UPnP Remote Access Architecture has been developed such that a UPnP device or a control point (CP) is operated in a home network as if they exist in the same network even if the UPnP device or the CP is physically outside the home network. The UPnP Remote Access Architecture defines a remote access server (RAS) existing within a home network and a remote access client (RAC) existing in a remote network.

SUMMARY

The present invention provides a UPnP method and a UPnP apparatus to easily set channel setting information (RATA profile) and pass network address translation (NAT) to provide remote access service.

Additional aspects and/or advantages will be set forth in part in the description which follows and, in part, will be apparent from the description, or may be learned by practice of the invention.

The foregoing and/or other aspects are achieved by providing a communication method of a universal plug and play (UPnP) remote access client (RAC) providing remote access service, the communication method including receiving external inputs of an identifier of a remote access server (RAS) to generate a credential and a session initiation protocol (SIP) identifier of the RAS, generating a payload of a first SIP packet including a credential identifier (ID) generated based on the identifier of the RAS, remote access transport agent (RATA) capability information, and a transport address (TA) set corresponding to candidate IP addresses to access the RAC, and transmitting the SIP packet to the RAS.

The method may further include receiving a second SIP packet, which includes a RATA profile for remote access and a TA set corresponding to candidate IP addresses to access the RAS in the form of a payload of the SIP packet, from the RAS, extracting the payload from the second SIP packet, and setting the RATA profile and the TA set of the RAS within the RAC.

A TA set of the RAC may include a TA, a reflexive TA, and a relaying TA. The TA may include a pair of an IP address allocated to the RAC and a port number of a service to access. The reflexive TA may include, when the RAC is in a NAT-based private network, a pair of a public IP address allocated to the network and a port number allocated to either a terminal or a service to access. The relaying TA may include, when the RAC is in a NAT-based private network and packets destined for the private network are relayed by a traversal using relays around a NAT (TURN) server, a pair of a public IP address allocated to the TURN server and a port number of a service to access.

A TA set of the RAS may include a TA, a reflexive TA, and a relaying TA. The TA may include a pair of an IP address allocated to the RAS and a port number of a service to access. The reflexive TA may include, when the RAS is in a NAT-based private network, a pair of a public IP address allocated to the network and a port number allocated to either a terminal or a service to access. The relaying TA may include, when the RAS is in the NAT-based private network and packets destined for the private network are relayed by a traversal using relays around a NAT (TURN) server, a pair of a public IP address allocated to the TURN server and a port number of a service to access.

The method may further include generating a credential by using the identifier of the RAS, determining the credential ID with respect to the generated credential, and generating the TA set corresponding to candidate IP addresses to access the RAC.

The payload of the SIP packet may be in either extensible markup language (XML) format or session description protocol (SDP) format.

The foregoing and/or other aspects are achieved by providing a communication method of a UPnP RAS providing remote access service, the communication method including receiving a first SIP packet including a credential ID, regarding RATA capability information, and a TA set corresponding to candidate IP addresses to access a RAC in the form of a payload of the first SIP packet, from the RAC, extracting the payload from the first SIP packet, setting the TA set of the RAC within the RAS, and transmitting the credential ID and the RATA capability information to a management console which has subscribed to receive events in advance.

The method may further include receiving RATA profiles with regard to the RAC and the RAS from the management console, and setting the RATA profile regarding the RAS within the RAS.

The method may further include generating a payload of a second SIP packet including the RATA profile regarding the RAC and a TA set corresponding to candidate IP addresses to access the RAS, and transmitting the SIP packet to the RAC.

The method may further include generating a TA set corresponding to candidate IP addresses to access the RAS.

The foregoing and/or other aspects are achieved by providing a computer readable recording medium having recorded thereon a computer program to cause a computer to execute the method above.

The foregoing and/or other aspects are achieved by providing a UPnP RAC providing remote access service, the UPnP RAC including a user interface unit receiving external inputs of an identifier of a RAS to generate a credential and a SIP identifier of the RAS, a SIP payload generating unit generating a payload of a SIP packet including a credential ID generated based on the identifier of the RAS, RATA capability information, and a TA set corresponding to candidate IP addresses to access the RAC, and a SIP packet transmitting unit transmitting the SIP packet to the RAS.

The foregoing and/or other aspects are achieved by providing a UPnP RAS providing remote access service, the UPnP RAS including a SIP packet receiving unit receiving a SIP packet including a credential ID, RATA capability information, and a TA set corresponding to candidate IP addresses to access a RAC in the form of a payload of the SIP packet, from the RAC, a SIP payload extracting unit extracting the payload from the SIP packet, a RAC TA configuring unit setting the TA set of the RAC within the RAS, and a management console transmitting interface transmitting the credential ID and the RATA capability information to a management console subscribed to receive events in advance.

BRIEF DESCRIPTION OF THE DRAWINGS

The above and other features will become more apparent by describing in detail embodiments thereof with reference to the attached drawings in which.

DETAILED DESCRIPTION OF EMBODIMENTS

Figure 1:
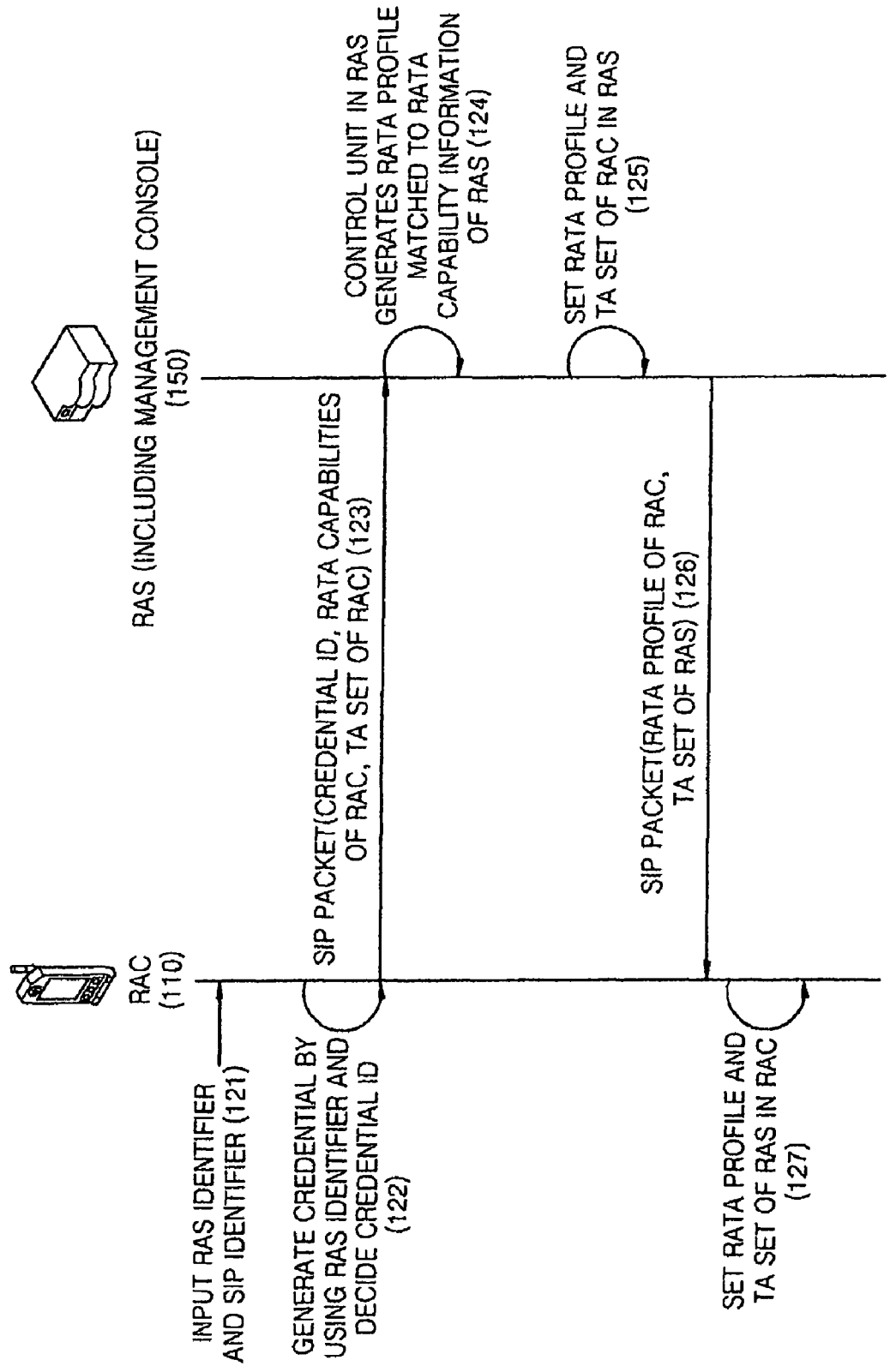
FIG. 1 is a diagram showing a process in which a remote access server (RAS) of a home network, which includes a management console in a remote server, and a remote access client (RAC) of a remote network sets remote access transport agent (RATA) profiles and transport address (TA) sets, according to an embodiment.

The present invention will now be described more fully with reference to the accompanying drawings, in which embodiments of the invention are shown. Like reference numerals in the drawings denote like elements. In the drawings, the thicknesses of layers and regions may be exaggerated for clarity.

FIG. 1 is a diagram showing a process in which a remote access server (RAS) 150 of a home network, which includes a management console in a remote server, and a remote access client (RAC) 110 of a remote network sets remote access transport agent (RATA) profiles and transport address (TA) sets, according to an embodiment.

The RAS 150 is a UPnP device existing within a home network, whereas the RAC 110 is a UPnP device existing within a remote network. The RAS 150 is a logic device supporting remote access service, and may be either a device physically identical to an internet gateway device (IGD) or a device separate from the IGD. The management console is a device to set configuration information related to remote access and control remote access service. In other words, the management console is a UPnP control point (CP) to control remote access service. The management console according to the current embodiment is included in the RAS 150. According to the current embodiment, new UPnP actions and state variables may be defined in the RAS 150, the RAC 110, and the management console.

The RAS 150 and the RAC 110 synchronize device list information, discovered in networks of each, via a remote access transport channel (RATC) therebetween. Thus, the RAC 110 in the remote network can discover UPnP devices within the home network. Then, the RAS 150 in the home network forwards a message to control a device, received by the RAC 110 in the remote network via the RATC, to a UPnP device corresponding to the message.

The management console provides parameters, which are required to set the RATC between the RAS 150 and the RAC 110, in the form of RATA profiles. The management console matches information regarding protocols to be used by the RATAs of the RAS 150 and the RAC 110 and capability information, and generates RATA profiles for each of the RAS 150 and RAC 110 based on the matched information. The RAS 150 and the RAC 110 sets the RATA profiles within themselves, so that the RATC can be set up between the RAS 150 and the RAC 110 later. If the RAS 150 and the RAC 110 exist in the same network, the RATA profile may be dynamically set up according to the UPnP Device Architecture 1.0.

Meanwhile, if the RAS 150 or the RAC 110 is in a private network that is network address translation (NAT) based, each of the devices provides a NAT passing address to a remote device in order to be accessed by the remote device. Here, a TA set is a set of addresses which can be candidates for an address to pass the NAT.

The addresses in the TA set are pairs of <IP address>:<Port Number>. In the current embodiment, three types of TA, including a TA, a reflexive TA, and a relaying TA, are used. A TA set is a group of independent TAs.

A TA is a pair of an IP address allocated to a UPnP device and a port number of a service to access. A reflexive TA is, when the RAS or the RAC is in a NAT-based private network, a pair of a public IP address allocated to the network and a port number allocated to either a terminal or a service to access. A reflexive TA can be obtained from a response to an inquiry to a simple traversal of the User Datagram Protocol (UDP) through NATs (STUN) server. A relaying TA is, when the RAS or the RAC is in a NAT-based private network and packets destined for the private network are relayed by a traversal using relays around the NAT (TURN) server, a pair of public IP addresses allocated to the TURN server and a port number of a service to access. Since a method forming a TA set in each device is defined in standard specification of the STUN and the TURN, detailed descriptions thereof will not be provided here.

More particularly, FIG. 1 shows a process in which a RAC without the RATA profile of the remote network sets a RATA profile and a TA set by the RAS of the home network.

In operation 121, an identifier of a RAS to generate a credential and a Session Initiation Protocol (SIP) identifier (i.e., an e-mail ID) are externally input to the RAC 110. The identifier of a RAS to generate a credential may be a product identification number (PIN) allocated to the RAS when the RAS is manufactured, and an externally input password.

In operation 122, the RAC 110 generates a credential and a credential ID by using an identifier of the RAS. The management console requires RATA capability information of the RAC 110 and a credential ID to generate a RATA profile. Thus, the RAC 110 generates a credential by using the identifier of the RAS received in operation 121 and determines a credential ID with respect to the generated credential.

In operation 123, the RAC 110 generates a SIP packet including the credential ID, RATA capability information, and a TA set of the RAC 110, and transmits the SIP packet to the RAS 150.

In operation 124, the management console included in the RAS 150 receives the credential ID of the RAC 110 and the RATA capability information. The management console matches protocols to be used by RATAs of the RAS 150 and the RAC 110 and capability information, and generates RATA profiles for the RAS 150 and the RAC 110 based on the matched information.

In operation 125, the RAS 150 sets a RATA profile of the RAS 150 and a TA set of the RAC 110 within the RAS 150. A TA set of the RAC 110 is used later to set up a remote access to the RAC 110.

In operation 126, the RAC 110 receives a SIP packet, which includes the RATA profile generated with regard to the RAC 110 in operation 124 and a TA set of the RAS 150, from the RAS 150.

In operation 127, the RAC 110 sets the RATA profile and the TA set of the RAS 150 within the RAC 110. Then, a RATC is set up between the RAS 150 and the RAC 110 by using the RATA profile and the TA set of the RAS 150. A combination of TAs to be used between the RAC 110 and the RAS 150 is selected according to a predetermined priority. If communication between the RAC 110 and the RAS 150 using a selected combination of TAs fails, a combination of TAs of next priority is selected.

According to the current embodiment, a RATA profile can be dynamically provided to a RAC in a remote network, where a RATA profile with regard to the remote access to RAS is not set in advance in a home network where a RAS including a management console exists. Here, the RAC only requires external inputs of an identifier of the RAS (i.e., PIN information) and a SIP identifier. Thus, a remote access channel can be set up easily.

Furthermore, according to the current embodiment, even if a RAS or a RAC is in a NAT-based private network, remote access service can still be provided by providing a NAT passing address to a remote device in the form of a TA set.

Figure 2:
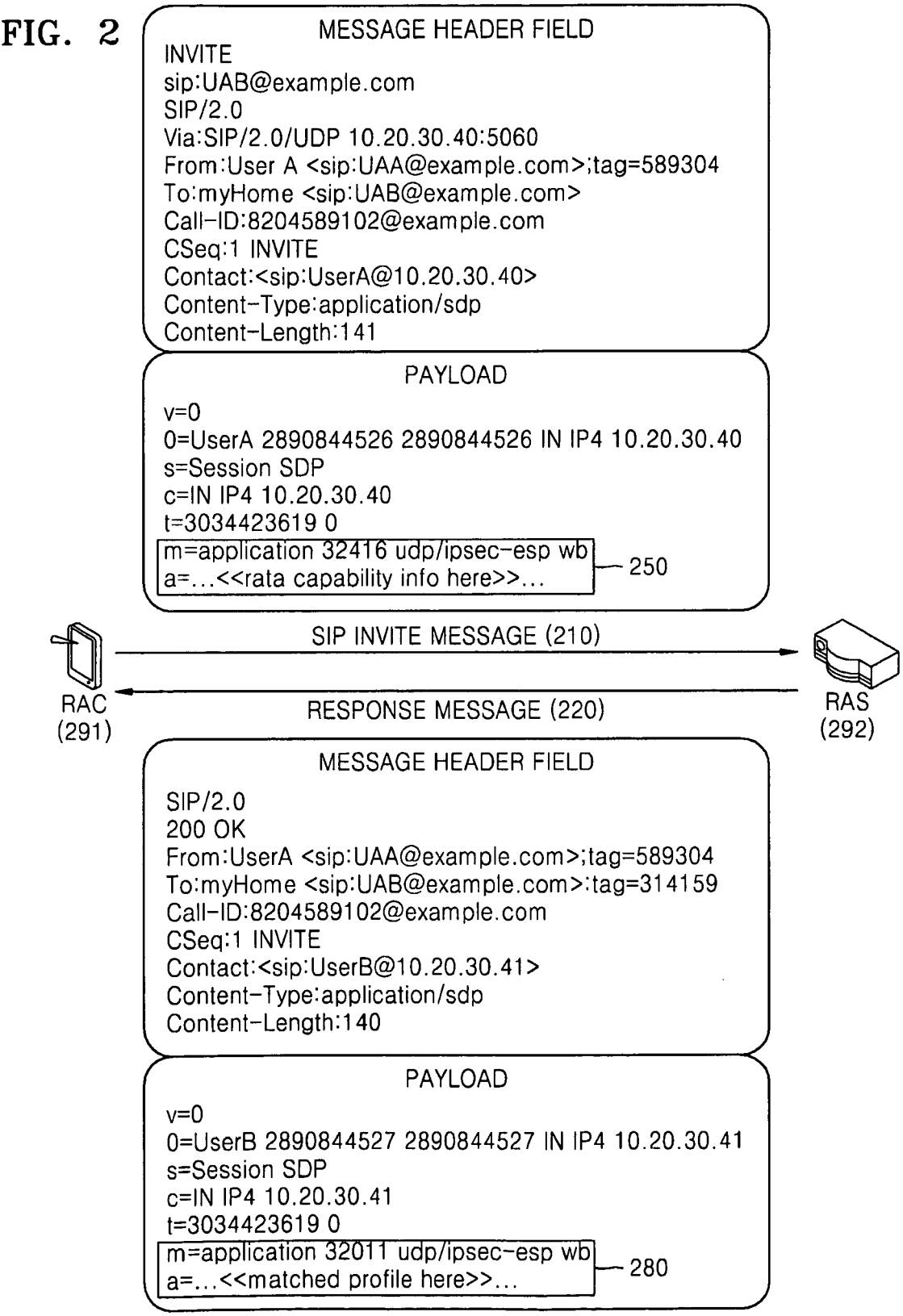
FIG. 2 is a diagram showing a process of transmitting a RATA profile, which uses a SIP protocol, and a RATA profile description format, which uses a session description protocol (SDP), according to an embodiment.

FIG. 2 is a diagram showing a process of transmitting a RATA profile, which uses a SIP protocol, and a RATA profile description format, which uses a session description protocol (SDP), according to an embodiment.

In operation 210, a RAC 291 describes a credential ID and RATA capability information by using SDP, and transmits them to a RAS 292 in the form of a SIP invite packet. Referring to FIG. 2, fields 250 of each of the credential ID and the RATA capability information are encoded in the SDP format. Meanwhile, although not shown, the credential ID and the RATA capability information may become payloads of a SIP packet in the XML format and may be transmitted to a RAS 292.

Furthermore, although not shown, the RAC 291 can also transmit its NAT passing address as a TA set to the RAS 292 by using the SDP format or the XML format.

In operation 220, the RAC 291 receives a RATA profile regarding the RAC 291, where the RATA profile is generated as a result of a matching operation performed by a management console included in the RAS 292. Referring to FIG. 2, each of a plurality of fields 280 of the RATA profile is encoded in the SDP format. Meanwhile, although not shown, the RATA profile may become payloads of a SIP packet in the XML format and may be transmitted by the RAS 292.

Furthermore, although not shown, the RAS 292 can also transmit its NAT passing address as a TA set to the RAC 291 by using the SDP format or the XML format.

Figure 3:
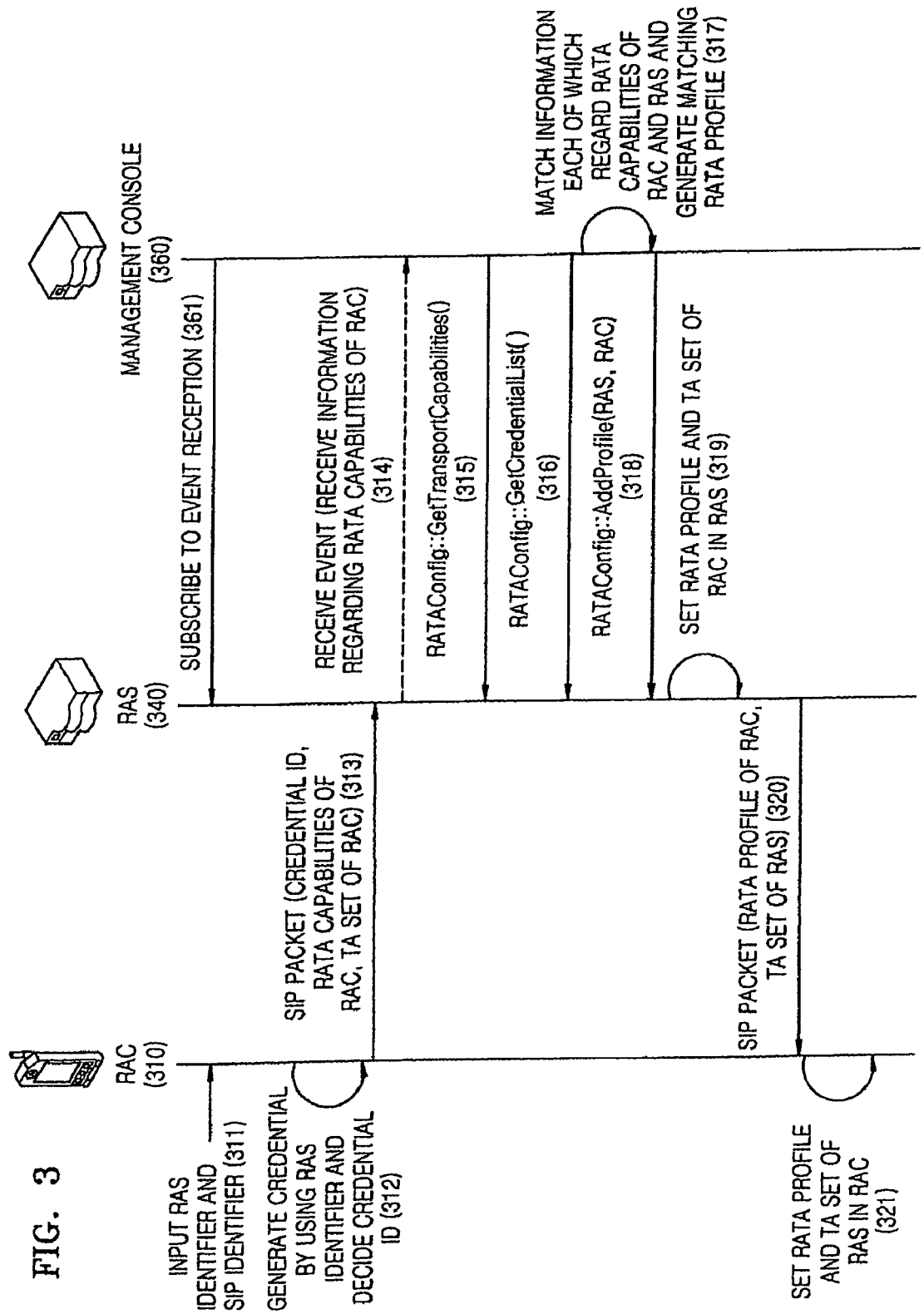
FIG. 3 is a diagram showing a process in which a RAC of a remote network and a RAS of a home network, according to another embodiment, set up RATA profiles and TA sets by using a separate management console.

FIG. 3 is a diagram showing a process in which a RAC 310 of a remote network and a RAS 340 of a home network, according to another embodiment, set up RATA profiles and TA sets by using a separate management console 360.

In operation 311, an identifier of the RAS 340 to generate a credential and a SIP identifier are externally input to the RAC 310. The identifier of the RAS 340 to generate a credential may be a product identification number (PIN), which is given to the RAS 340 when the RAS 340 is manufactured, and an externally input password.

In operation 312, the RAC 310 generates a credential and a credential ID by using the identifier of the RAS 340. The management console 360 requires RATA capability information and a credential ID of the RAC 310 to generate a RATA profile. Thus, the RAC 310 generates a credential by using the identifier of the RAS 340, which is received in operation 311, and determines a credential ID with respect to the generated credential.

In operation 313, the RAC 310 generates a SIP packet, which includes the credential ID, the RATA capability information, and a TA set of the RAC 310, and transmits the SIP packet to the RAS 340.

In operation 314, the management console 360 receives an event message from the RAS 340, to which the management console 360 has subscribed to receive an event (operation 361), the event message indicating that the RAS 340 has received the credential ID and the RATA capability information of the RAC 310.

In operations 315 and 316, the management console 360 receives the credential ID and the RATA capability information of the RAC 310 via a UPnP action.

In operation 317, the management console 360 matches protocols and capability information that are to be used by the RATAs of the RAS 340 and the RAC 310 and generates RATA profiles with regard to the RAS 340 and the RAC 310.

In operation 318, the management console 360 transmits the generated RATA profiles to the RAS 340 via a UPnP action.

In operation 319, the RAS 340 sets up its RATA profile and a TA set of the RAC 310 within the RAS 340.

In operation 320, the RAC 310 receives a SIP packet, which includes the RATA profile of the RAC 310 and a TA set of the RAS 340, from the RAS 340.

In operation 321, the RAC 310 sets up the RATA profile and the TA set of the RAS 340 within the RAC 310. Then, the RAC 310 establishes a RATC between the RAS 340 and the RAC 310 by using the RATA profile and the TA set of the RAS 340.

According to another embodiment, a RATA profile can be dynamically provided to a RAC of a remote network, where a RATA profile with regard to the remote access is not set up in advance in a home network and where a RAS and a management console exist. Here, the RAC only requires external inputs of an identifier of the RAS (i.e., PIN information) and a SIP identifier. Thus, remote access channel setup can be performed easily.

Furthermore, according to the current embodiment, even if a RAS or a RAC is within a NAT-based private network, remote access service can be provided by providing a NAT passing address in the form of a TA set to a remote device.

Figure 4:
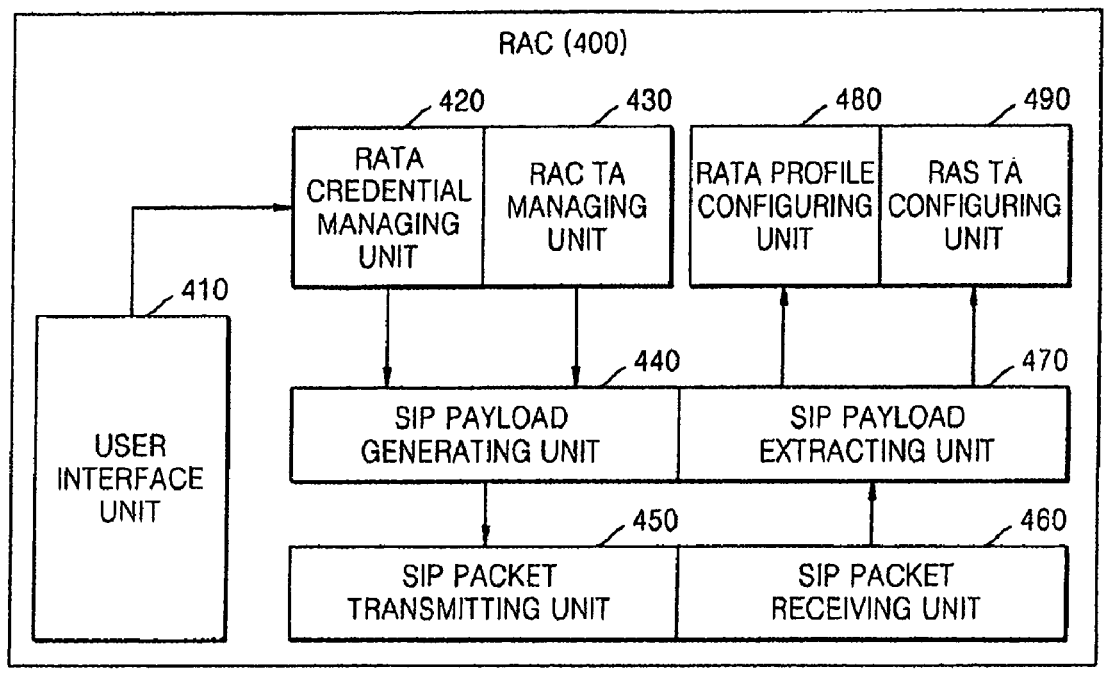
FIG. 4 is a block diagram illustrating the structure of a RAC according to an embodiment.

FIG. 4 is a block diagram illustrating the structure of a RAC 400 according to an embodiment. Referring to FIG. 4, the RAC 400 according to the present embodiment includes a user interface unit 410, a RATA credential managing unit 420, a RAC TA managing unit 430, a SIP payload generating unit 440, a SIP packet transmitting unit 450, a SIP packet receiving unit 460, a SIP payload extracting unit 470, a RATA profile configuring unit 480, and a RAS TA configuring unit 490.

The user interface unit 410 receives external inputs of an identifier (i.e., PIN information) of a RAS and a SIP identifier (i.e., an e-mail ID) of the RAS to generate a credential.

The RATA credential managing unit 420 generates a credential by using the identifier of the RAS and decides a credential ID with respect to the generated credential.

The RAC TA managing unit 430 generates a TA set corresponding to candidate IP addresses to access the RAC 400.

The SIP payload generating unit 440 generates a payload of a SIP packet, which includes a credential ID, RATA capability information, and the TA set of the RAC 400. The SIP packet transmitting unit 450 transmits the SIP packet to the RAS.

The SIP packet receiving unit 460 receives a SIP packet for remote access, the SIP packet including a RATA profile and a TA set of the RAS.

The SIP packet extracting unit 470 extracts the payload, which includes the RATA profile and the TA set of the RAS for remote access, from the SIP packet.

The RATA profile configuring unit 480 sets the RATA profile, which is for remote access, within the RAC 400. The RAS TA configuring unit 490 sets up a RATC between the RAC 400 and the RAS by using the RATA profile and the TA set of the RAS.

Figure 5:
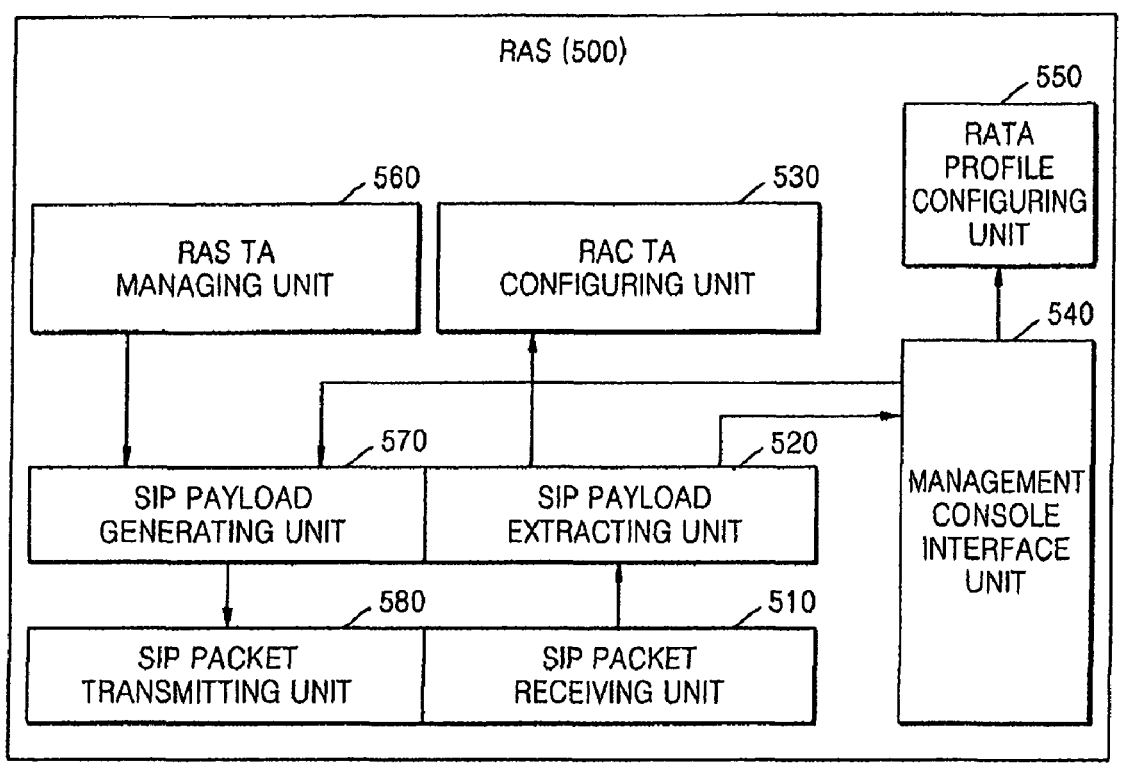
FIG. 5 is a block diagram illustrating the structure of a RAS according to an embodiment.

FIG. 5 is a block diagram illustrating the structure of a RAS 500 according to an embodiment. Referring to FIG. 5, the RAS 500 according to the present embodiment includes a SIP packet receiving unit 510, a SIP payload extracting unit 520, a RAC TA configuring unit 530, a management console interface unit 540, a RATA profile configuring unit 550, a RAS TA managing unit 560, a SIP payload generating unit 570, and a SIP packet transmitting unit 580.

The SIP packet receiving unit 510 receives a SIP packet, which includes a credential ID, RATA capability information, and a TA set of the RAC, from the RAC. The SIP payload extracting unit 520 extracts a payload, which includes the credential ID, the RATA capability information, and the TA set of the RAC, from the SIP packet.

The RAC TA configuring unit 530 sets the TA set of the RAC within the RAS 500.

The management console interface unit 540 includes a management console transmitting interface unit (not shown), which transmits the credential ID and the RATA capability information to a management console subscribed to receive an event in advance, and a management console receiving interface unit (not shown), which receives RATA profiles regarding the RAC and the RAS 500 from the management console.

The RATA profile configuring unit 550 sets the RATA profile regarding the RAS 500 within the RAS 500.

The RAS TA managing unit 560 generates a TA set corresponding to candidate IP addresses to access the RAS 500.

The SIP payload generating unit 570 generates a payload of a SIP packet, which includes the RATA profile regarding the RAC and the TA set of the RAS 500. The SIP packet transmitting unit 580 transmits the SIP packet to the RAC.

Figure 6:
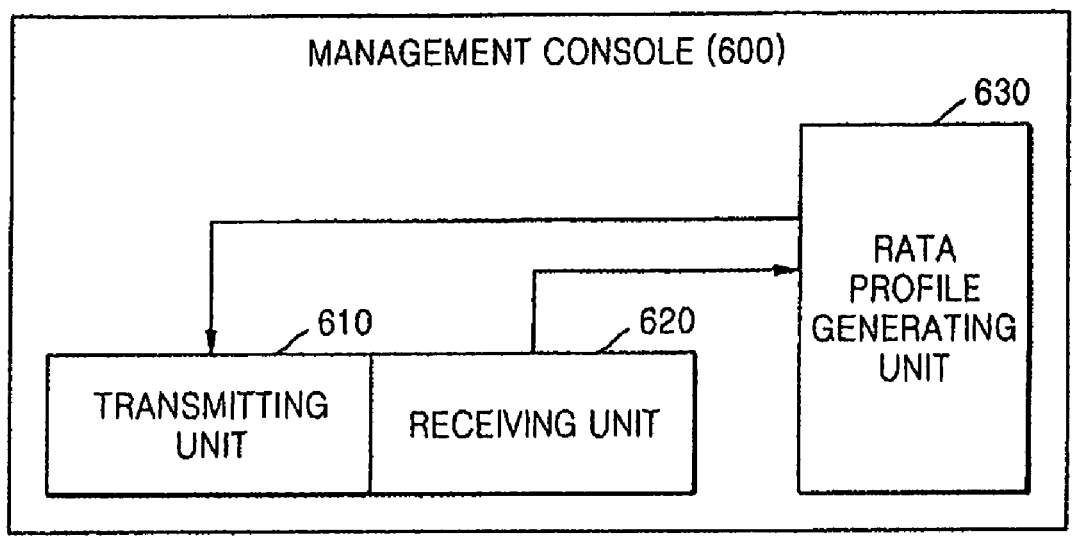
FIG. 6 is a block diagram illustrating the structure of a management console according to an embodiment.

FIG. 6 is a block diagram illustrating the structure of a management console 600 according to an embodiment.

Referring to FIG. 6, the management console 600 according to the present embodiment includes a transmitting unit 610, a receiving unit 620, and a RATA profile generating unit 630. The receiving unit 620 receives a credential ID and RATA capability information of a RAC from a RAS to which the management console 600 subscribes to receive events in advance. The RATA profile generating unit 630 generates RATA profiles with regard to the RAC and the RAS. The transmitting unit 610 transmits the RATA profiles to the RAS. The management console 600 may be either a physically separate device or an internal unit within the RAS.

The embodiments can be written as computer programs and can be implemented in general-use digital computers that execute the programs using a computer readable medium. Examples of the computer readable medium include recording media, such as magnetic storage media (e.g., ROM, floppy disks, hard disks, etc.) and optical recording media (e.g., CD-ROMs, or DVDs), and media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A communication method of a universal plug and play (UPnP) remote access client (RAC) providing remote access service, the communication method comprising:

receiving external inputs of an identifier of a remote access server (RAS) to generate a credential, and a session initiation protocol (SIP) identifier of the RAS;

generating a payload of a first SIP packet including a credential identifier (ID) generated based on the identifier of the RAS, remote access transport agent (RATA) capability information, and a transport address (TA) set corresponding to candidate IP addresses to access the RAC; and transmitting the first SIP packet to the RAS, wherein the identifier of the RAS is a product identification number (PIN) allocated to the RAS.

2. The communication method of claim 1, further comprising:

receiving a second SIP packet including the RATA profile of the RAC generated in the RAS using the credential ID and the RATA capability information, and a TA set corresponding to candidate IP addresses to access the RAS in the form of a payload of the second SIP packet, from the RAS;

extracting the payload from the second SIP packet; and setting the RATA profile and the TA set of the RAS within the RAC.

3. The communication method of claim 1, wherein a TA set of the RAC includes a TA, a reflexive TA, and a relaying TA, the TA including a pair of an IP address allocated to the RAC and a port number of a service to access, the reflexive TA including, when the RAC is in a network address translation (NAT)-based private network, a pair of a public IP address allocated to the NAT-based private network and a port number allocated to either a terminal or a service to access, and the relaying TA including, when the RAC is in the NAT-based private network and packets destined for the NAT-based private network are relayed by a traversal using relays around a NAT (TURN) server, a pair of a public IP address allocated to the TURN server and a port number of a service to access.

4. The communication method of claim 2, wherein a TA set of the RAS includes a TA, a reflexive TA, and a relaying TA, the TA including a pair of an IP address allocated to the RAS and a port number of a service to access, the reflexive TA including, when the RAS is in a network address translation (NAT)-based private network, a pair of a public IP address allocated to the NAT-based private network and a port number allocated to either a terminal or a service to access, and the relaying TA includes, when the RAS is in the NAT-based private network and packets destined for the NAT-based private network are relayed by a traversal using relays around a NAT (TURN) server, a pair of a public IP address allocated to the TURN server and a port number of a service to access.

5. The communication method of claim 1, further comprising:
generating a credential by using the identifier of the RAS; and
determining the credential ID with respect to the generated credential; and
generating the TA set corresponding to candidate IP addresses to access the RAC.

6. The communication method of claim 1, wherein the payload of the first SIP packet is in either extensible markup language (XML) format or session description protocol (SDP) format.

7. A non-transitory computer readable recording medium having recorded thereon a computer program to cause a computer to execute the method of claim 1.

8. A communication method of a universal plug and play (UPnP) remote access server (RAS) providing remote access service, the communication method comprising:
receiving a first session initiation protocol (SIP) packet including a credential identifier (ID), remote access transport agent (RATA) capability information, and a transport address (TA) set corresponding to candidate IP addresses to access a remote access client (RAC) in the form of a payload of the first SIP packet, from the RAC;
extracting the payload from the first SIP packet;
setting the TA set of the RAC within the RAS; and
transmitting the credential ID and the RATA capability information to a management console which has subscribed to receive events in advance,
wherein the credential ID is generated by the RAC using an identifier of the RAS which is a product identification number (PIN) allocated to the RAS.

9. The communication method of claim 8, further comprising:
generating RATA profiles for the RAS and the RAC using the credential ID and the RATA capability information for remote access, by the management console;
receiving the RATA profiles of the RAC and the RAS from the management console; and
setting the RATA profile of the RAS within the RAS.

10. The communication method of claim 9, further comprising:
generating a payload of a second SIP packet including the RATA profile of the RAC and a TA set corresponding to candidate IP addresses to access the RAS; and
transmitting the second SIP packet to the RAC.

11. The communication method of claim 10, further comprising generating a TA set corresponding to candidate IP addresses to access the RAS.

12. A non-transitory computer readable recording medium having recorded thereon a computer program to cause a computer to execute the method of claim 8.

13. A universal plug and play (UPnP) remote access client (RAC) providing remote access service, the UPnP RAC comprising:
a user interface unit receiving external inputs of an identifier of a remote access server (RAS) to generate a credential, and a session initiation protocol (SIP) identifier of the RAS;
a SIP payload generating unit generating a payload of a first SIP packet including a credential identifier (ID) generated based on the identifier of the RAS, remote access transport agent (RATA) capability information, and a transport address (TA) set corresponding to candidate IP addresses to access the RAC; and
a SIP packet transmitting unit transmitting the first SIP packet to the RAS,
wherein the identifier of the RAS is a product identification number (PIN) allocated to the RAS.

14. The UPnP RAC of claim 13, further comprising:
a SIP packet receiving unit receiving a second SIP packet including a RATA profile of the RAC generated in the RAS using the credential ID and the RATA capability information for remote access and a TA set corresponding to candidate IP addresses to access the RAS in the form of a payload of the second SIP packet, from the RAS;
a SIP packet extracting unit extracting the payload from the second SIP packet;
a RATA profile configuring unit setting the RATA profile within the RAC; and
a RAS TA configuring unit setting the TA set of the RAS within the RAC.

15. The UPnP RAC of claim 13, wherein a TA set of the RAC includes a TA, a reflexive TA, and a relaying TA, the TA including a pair of an IP address allocated to the RAC and a port number of a service to access, the reflexive TA including, when the RAC is in a network address translation (NAT)-based private network, a pair of a public IP address allocated to the NAT-based private network and a port number allocated to either a terminal or a service to access, and the relaying TA including, when the RAC is in the NAT-based private network and packets destined for the NAT-based private network are relayed by a traversal using relays around a NAT (TURN) server, a pair of a public IP address allocated to the TURN server and a port number of a service to access.

16. The UPnP RAC of claim 14, wherein a TA set of the RAS includes a TA, a reflexive TA, and a relaying TA, the TA including a pair of an IP address allocated to the RAS and a port number of a service to access, the reflexive TA including, when the RAS is in a network address translation (NAT)-based private network, a pair of a public IP address allocated to the NAT-based private network and a port number allocated to either a terminal or a service to access, and the relaying TA including, when the RAS is in the NAT-based private network and packets destined for the NAT-based private network are relayed by a traversal using relays around a NAT (TURN) server, a pair of a public IP address allocated to the TURN server and a port number of a service to access.

17. The UPnP RAC of claim 13, further comprising:
a RATA credential managing unit generating a credential by using the identifier of the RAS and determining a credential identifier (ID) with respect to the generated credential; and
a RAC TA managing unit generating the TA set corresponding to candidate IP addresses to access the RAC.

18. The UPnP RAC of claim 13, wherein the payload of the first SIP packet is in either extensible markup language (XML) format or session description protocol (SDP) format.

19. A universal plug and play (UPnP) remote access server (RAS) providing remote access service, the UPnP RAS comprising:
a session initiation protocol (SIP) packet receiving unit receiving a first SIP packet including a credential identifier (ID), remote access transport agent (RATA) capability information, and a transport address (TA) set corresponding to candidate IP addresses to access a remote access client (RAC) in the form of a payload of the first SIP packet, from the RAC;
a SIP payload extracting unit extracting the payload from the first SIP packet;
a RAC TA configuring unit setting the TA set of the RAC within the RAS; and
a management console transmitting interface transmitting the credential ID and the RATA capability information to a management console subscribed to receive events in advance,
wherein the credential ID is generated by the RAC using an identifier of the RAS which is a product identification number (PIN) allocated to the RAS.

20. The UPnP RAS of claim 19, further comprising:
a management console receiving interface unit receiving RATA profiles of the RAC and the RAS generated by the management console using the credential ID and the RATA capability information, from the management console; and
a RATA profile configuring unit setting the RATA profile of the RAS within the RAS.

21. The UPnP RAS of claim 20, further comprising:
a SIP payload generating unit generating a payload of a second SIP packet including the RATA profile of the RAC and a TA set corresponding to candidate IP addresses to access the RAS; and
a SIP packet transmitting unit transmitting the SIP packet to the RAC.

22. The UPnP RAS of claim 21, further comprising a RAS TA managing unit generating the TA set corresponding to candidate IP addresses to access the RAS.

* * * * *